United States Patent [19]

Kitamura

[11] Patent Number: 4,779,205

[45] Date of Patent: Oct. 18, 1988

[54] A NUMERICALLY-CONTROLLED MACHINE TOOL WITH A FLOPPY DISK CONTROL PANEL

[75] Inventor: Koichiro Kitamura, Takaoka, Japan

[73] Assignee: Kitamura Machinery Co., Ltd., Japan

[21] Appl. No.: 886,687

[22] Filed: Jul. 18, 1986

[30] Foreign Application Priority Data

Aug. 13, 1985 [JP] Japan ................................ 60-177005

[51] Int. Cl.⁴ ........................ G06F 15/46; G05B 19/18
[52] U.S. Cl. ................................ 364/474.22; 364/188; 364/167.01
[58] Field of Search ................ 364/167, 171, 180–181, 364/188–189, 191–194, 474; 318/567–569, 600; 340/825.22, 825.23

[56] References Cited

U.S. PATENT DOCUMENTS

| | | | |
|---|---|---|---|
| 4,163,284 | 7/1979 | Kishi et al. | 364/474 |
| 4,360,878 | 11/1982 | Waller | 364/474 |
| 4,433,383 | 2/1984 | Maurer | 364/474 |
| 4,435,771 | 3/1984 | Nozawa et al. | 364/474 |
| 4,437,150 | 3/1984 | Dahlgren, Jr. et al. | 364/474 |
| 4,550,532 | 11/1985 | Fletcher, Jr. et al. | 364/474 X |
| 4,584,649 | 4/1986 | Komanduri et al. | 318/568 X |
| 4,607,327 | 8/1986 | Kishi et al. | 364/191 |

*Primary Examiner*—Gary V. Harkcom
*Attorney, Agent, or Firm*—Ronald P. Kananen

[57] ABSTRACT

A numerically-controlled (NC) machine tool includes a machining center (1), a NC machine (2) for controlling the machining center (1) and an operator control panel (3) placed thereto. A floppy disk unit (4) is provided at the operator control panel (3) of the NC machine tool in such a way that a floppy disk (12) can be set in the floppy disk unit (4).

1 Claim, 3 Drawing Sheets

A NUMERICALLY-CONTROLLED MACHINE TOOL WITH A FLOPPY DISK CONTROL PANEL

BACKGROUND OF THE INVENTION

This invention relates to a NC machine tool.

A conventional NC machine tool includes a machining center and or NC machine in which paper tapes are used for the controlling purpose. Data in a paper tape is read by the NC machine so as to control the machining center.

As is well-known, if paper tapes are used, an operator cannot check the data stored therein when he operates a NC machine tool in front of an operator control panel thereof on a production line. Also, it is impossible to quickly print out the data stored in paper tapes.

SUMMARY OF THE INVENTION

The object of this invention is to provide a NC machine tool in which an operator can check easily data for controlling the machine tool.

According to this invention, there is provided a NC machine tool including a machining center, a NC machine for controlling the machining center, and an operator control panel placed thereto characterized by a floppy disk unit (4) being provided at the operator control panel (3) of the NC machine tool in such a way that a floppy disk (12) can be set in the floppy disk unit (4).

DETAILED DESCRIPTION OF THE PREFERRED EMBODIMENT

Figure 1:
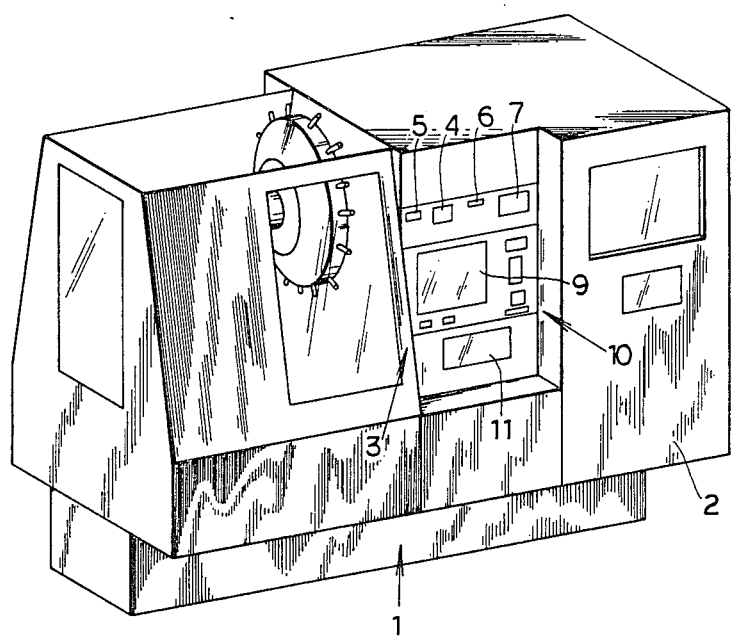
FIG. 1 is schematic perspective view showing a NC machine tool according to an embodiment of this invention.

In FIG. 1, a NC machine tool according to this invention includes a machining center 1, a NC machine 2 for controlling the machining center 1, and an operator panel 3 which is placed adjacent to the NC machine 2 at a front end portion of the machining center 1. An example of the NC machine is a conventional NC machine available under FANUC 10/11/12 (tradename). NC tapes may be used in the NC machine 2 in a conventional manner.

Figure 2:
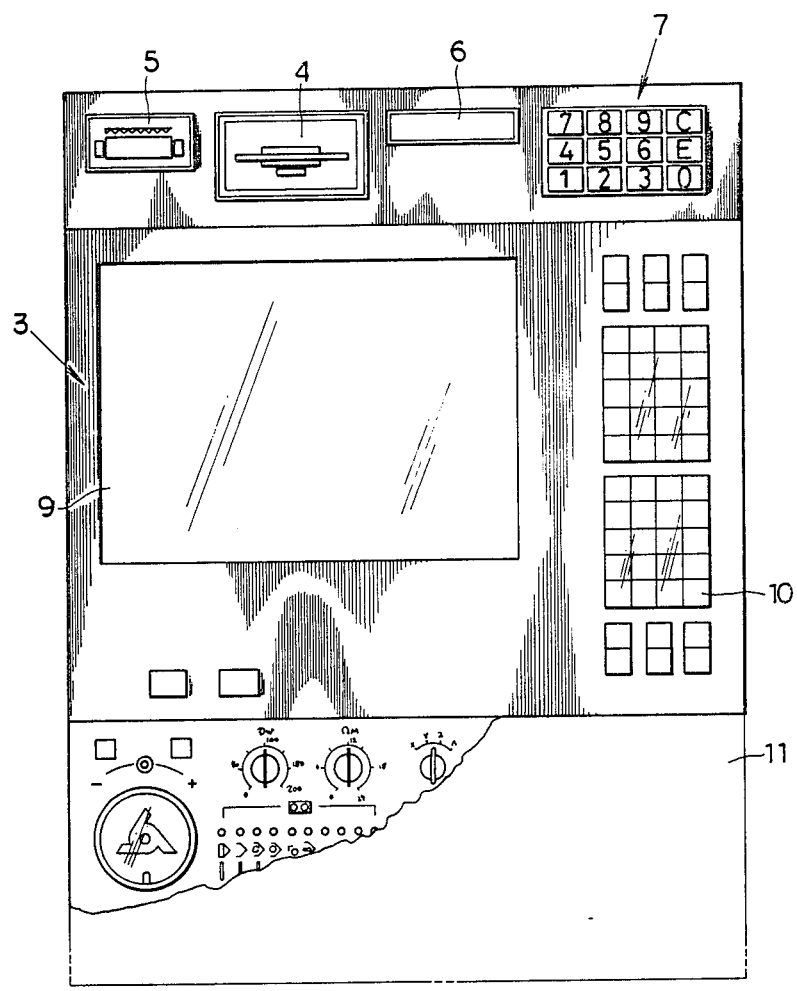
FIG. 2 is a front view showing an operator control panel of the NC machine tool shown in FIG. 1.
Figure 3:
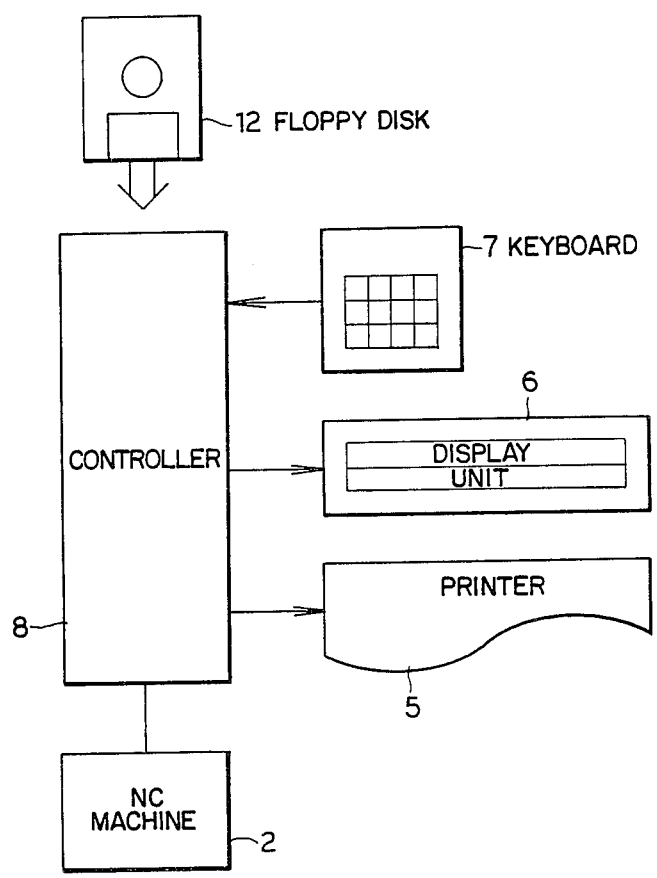
FIG. 3 is an explanatory view showing relations among a floppy disk and its related members for the NC machine shown in FIG. 1.

As best shown in FIG. 2, a floppy disk unit 4 is provided at the operator control panel 3. As shown in FIGS. 2 and 3, the floppy disk unit 4 in which the floppy disk 12 is to be set is connected electrically to a printer 5, a display unit 6, a keyboard 7 and the NC machine 2 by way of a controller 8. The printer 5, the display unit 6 and the keyboard 7 are provided at the operator control panel 3.

Also, the operator control panel 3 is provided with a CRT 9 such as a Braun tube and two switch boards 10, 11 having various switches.

The floppy disk 12 is compact and has a large storage capacity and high input and output speeds. A 3.5-inch type floppy disk having a storage capacity of 1 megabyte is preferred. Such a 3.5-inch type floppy disk corresponds in capacity to a paper tape of 1560 m. In this case, 255 data can be filed in one floppy disk.

For instance, the floppy disk 12 may store the following data:
(1) A variety of program data (00000-09999)
(2) Tool correction data (000001)
(3) NC system parameter (000008)
(4) NC system pitch error data (000009)

In these data, "O" means O of the alphabet and the numerals mean file numbers. In the data (1) as above stated, access is possible from the programs of the NC machine 2. In the data (2)-(4), only keyboard operation is possible.

Table 1 shows an example of an operation mode according to this invention:

TABLE 1

| Items | Keyboard | NC command |
|---|---|---|
| Storage into file | Possible | Impossible |
| Output from file | Possible | G code |
| Display & Print of file number | Possible | Impossible |
| Display & Print of file contents | Possible | Impossible |
| Disk initializing | Possible | G code |
| File deletion | Possible | G code |

The access operation of the floppy disk 12 can be carried out by a simple command from the NC machine 2. Data files of the floppy disk 12 can be automatically stored from the programs of the NC machine 2. Also, the data in a memory of the NC machine 2 can be deleted if desired. Therefore, even if the data stored in the memory of the NC machine 2 is large, large programs can be stored in the floppy disk 12.

The display unit 6 may be a conventional crystalline liquid display unit having an area for displaying 20 words in each of two lines. The display 6 is used to display operation guides to an operator.

The printer 5 is used to print out both operation guides and movement contents on a paper or the like by operating the keyboard 7 so that the data thereof can be completely held. A preferred example of the printer 5 is a thermal printer which can print out 20 words on each line.

The CRT 9 may be also used to display any data in addition to the display unit 6.

In operation, the floppy disk 12 is set in the floppy disk unit 4 while a NC tape (not shown) is set in the NC machine 2. Thereafter, the display unit 6 displays the file directories, the used memory length, and the unused memory length of the NC machine 2. Also, the same data are printed out by the printer 5 by operating the keyboard 7.

Next, the floppy disk 12 is initialized through the controller 8 by programs of the NC machine 2 or operation of the keyboard 7. This operation guide is displayed on the display unit 6.

After that, various data such as the data (1)-(4) as above stated are memorized or stored into the floppy disk 12 from the NC machine 2, for example, when the NC tape is punched out in the NC machine 2. This operation guide is displayed on the display unit 6. Also, the operation guide and movement contents are printed out by the printer 5.

The stored data in the floppy disk 12 are read by the NC machine 2 by programs of the NC machine 2 or operation of the keyboard 7 so that the machining center 1 operates according to the control signals from the NC machine 2. This operation guide is displayed on the display unit 6, and the operation guide and movement contents are printed out by the printer 5.

If any designated file in the floppy disk 12 is deleted, such an operation guide is displayed on the display unit 6, and the operation guide and movement contents are printed out by the printer 5. Such deletion of the file can be carried out by programs of the NC machine 2 or operation of the keyboard 7.

The designated data file can be printed out by operating the keyboard 7. This operation guide is displayed on the display unit 6, and the operation guide and the movement contents are printed out by the printer 5.

All operation guides are displayed on the display unit 6 by a step-by-step method, and all operation guides and movement contents are printed out by the data printer 5 so that an operator can check them easily at the NC machine tool.

What is claimed is:

1. A numerically-controlled machine tool comprising a machining center (1), a NC machine (2) for controlling the machining center (1) according to data of a NC tape set in the machine, an operator control panel (3) placed near a central portion of the machine (2), said operator control panel (3) being provided with a floppy disk unit (4) in which a floppy disk (12) is set, a printer (5), a display unit (6), a keyboard (7), and a controller (8), said printer, display unit, and keyboard being provided at the operator control panel and said floppy disk being connected electrically to the printer, the display unit, the keyboard, and the NC machine by way of said controller, said operator control panel being further provided with a CRT, said floppy disk being connected to automatically store data files of the NC machine upon command so that all operation guides are displayed on the display unit and printed out by the printer for ease of checking by an operator at the machine tool, means for initializing said floppy disk through said controller by programs of the NC machine or operation of the keyboard and displaying the operation guide on the display unit, whereupon data from the NC machine (2) are stored on said floppy disk, said data being displayed on said display unit, said printer printing an operation guide and movement contents, and wherein when a floppy disk is set in the floppy disk unit while an NC tape is set in the NC machine (2), the display unit (6) displays the file directories, the used memory length and the unused memory length of the NC machine while such display is printed out by the printer enabled by said keyboard, and wherein stored data on the floppy disk are read by programs of the NC machine or operation of the keyboard so that the machining center operates according to the control signals from the NC machine while displaying and printing an operation guide representative thereto on said display unit and said printer respectively.

* * * * *